United States Patent [19]
Wedi

[11] Patent Number: 5,961,900
[45] Date of Patent: Oct. 5, 1999

[54] METHOD OF MANUFACTURING COMPOSITE BOARD

[76] Inventor: Helmut Wedi, 48282 Emedetten, Im Bail, Germany

[21] Appl. No.: 08/244,653

[22] Filed: Jun. 6, 1994

[30] Foreign Application Priority Data

Oct. 10, 1992 [DE] Germany ............................ 42 34 269
Sep. 4, 1993 [DE] Germany ......................... 93 13 351 U
Oct. 9, 1993 [WO] WIPO ...................... PCT/EP93/02769

[51] Int. Cl.⁶ .................................................. B29C 70/02
[52] U.S. Cl. .................. 264/40.4; 264/145; 264/173.11; 264/257; 264/321
[58] Field of Search ................................. 264/40.4, 145, 264/173.11, 257, 321

[56] References Cited

U.S. PATENT DOCUMENTS

| | | | |
|---|---|---|---|
| 2,625,709 | 1/1953 | Schairer | 264/257 |
| 3,391,013 | 7/1968 | Videen | 264/257 |
| 3,863,908 | 2/1975 | Charpentier | 264/321 |
| 4,344,804 | 8/1982 | Bijen et al. | 264/257 |
| 4,450,022 | 5/1984 | Galer | 264/257 |
| 4,468,429 | 8/1984 | Takeda et al. | 264/257 |
| 4,503,096 | 3/1985 | Specht | 427/359 |
| 4,778,718 | 10/1988 | Nicholls | 264/257 |
| 5,308,572 | 5/1994 | Hackman | 264/257 |
| 5,350,554 | 9/1994 | Miller | 264/171 |

FOREIGN PATENT DOCUMENTS

| | | | |
|---|---|---|---|
| 60-32608 | 2/1985 | Japan | 264/257 |
| 61-656 | 1/1986 | Japan | 264/257 |

*Primary Examiner*—Allan R. Kuhns
*Attorney, Agent, or Firm*—Furgang & Milde, LLP

[57] ABSTRACT

A method of manufacturing composite board whereby a continuous coat of mortar reinforced with glass cloth or a similar material is laid onto a continuous core. The still fluid mortar dribbles onto the core at a specific viscosity and is distributed over the core. The rate at which the mortar dribbles is regulated.

15 Claims, 7 Drawing Sheets

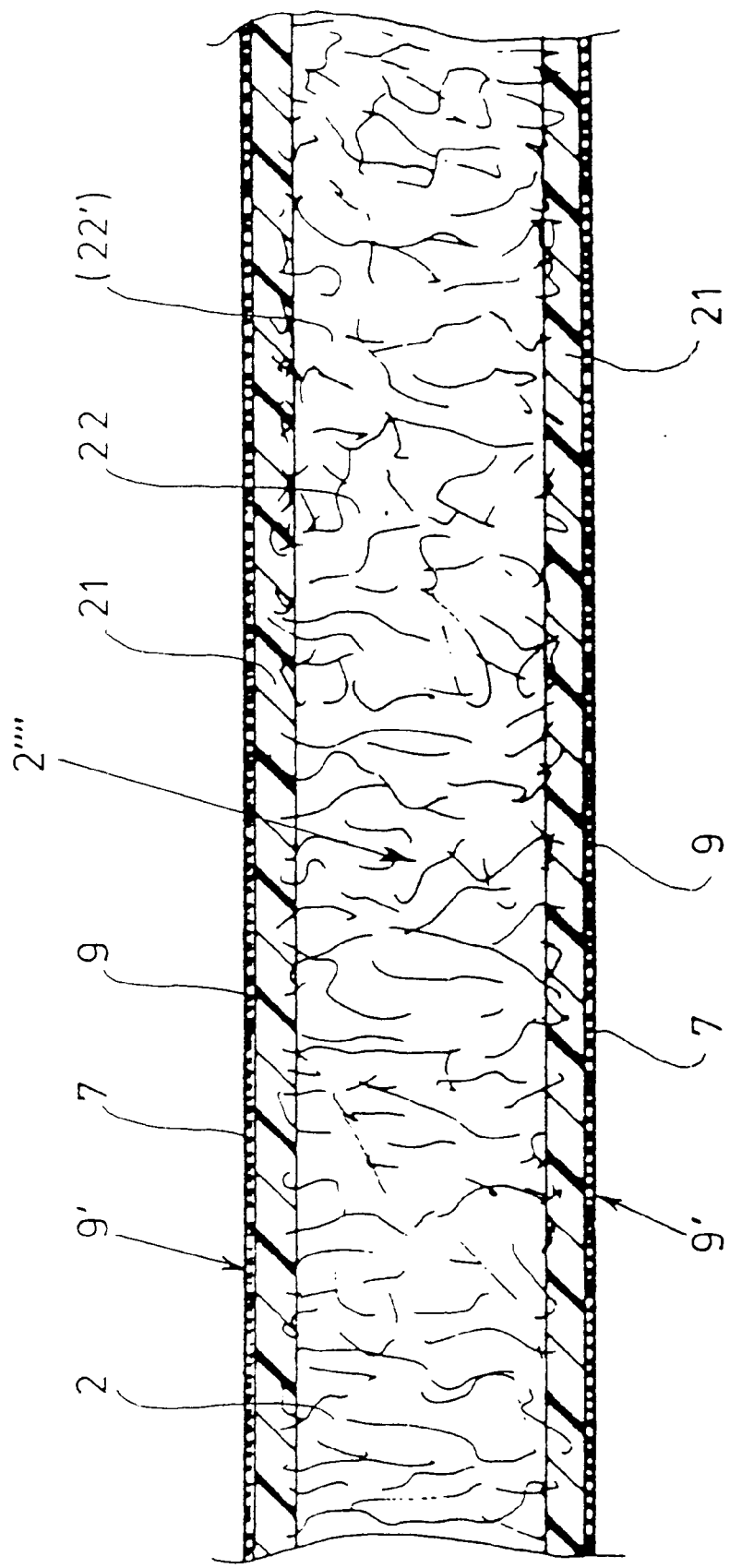

METHOD OF MANUFACTURING COMPOSITE BOARD

BACKGROUND OF THE INVENTION

The present invention concerns a method of manufacturing composite board whereby a continuous coat of mortar reinforced with glass cloth or a similar material is laid onto a continuous core.

The Austrian Patent No. 242,581 discloses a method of manufacturing composite boards with cores of expanded material. The cores are positioned and introduced horizontal and coated with soft mortar. The mortar is compacted with a pivoting cylinder. Downstream of the cylinder glass cloth is removed from a roll, forced down against the top of the mortar, and entrained by the advancing web. Farther downstream another coating of mortar is applied loosely to the first coating and the glass cloth and compacted with another pivoting cylinder.

The two coats of plastic over the expanded-material core of a composite manufactured by the method disclosed in the Austrian Patent No. 242,581 are together much thicker than their framing. They are heavy and inappropriate for such interior structures as tiled walls. Such composites are accordingly primarily employed on flat roofs and facades. In other words, much more mortar is used to embed and attach the glass cloth than is needed for interior construction.

The German Patent No. 3,423,006 C2 discloses a method of manufacturing light-weight structural boards. A woven or knitted fabric is stretched tight over an expanded-material component and covered with a thin coating of water-resistant mortar. The mortar is then smoothed and adheres tight to the fabric. One drawback is that, while the fabric is being stretched, forces can be exerted between it and the plastic that tend to separate the two. Another drawback is that each board is separately covered with fabric and coated with mortar. Such discontinuous production is expensive.

A method of manufacturing similar boards is known from the British Patent No. 1,459,575. A mixer pours a base onto a belt that advances at a constant speed. A doctor distributes the material to a prescribed thickness. A sealant is similarly applied to the base and a surface to the sealant. One drawback to this approach is that the thickness of each layer depends on the speed of the belt and on the skill of the personnel.

The German Patent No. 3,136,935 C1 describes a method of manufacturing board. The core of the board essentially comprises layers of adjacent and parallel mineral fibers. The fibers are oriented at an angle of 10 to 60° to the surface of the board. A sheet of aluminum or plastic is applied to the layers of fiber and a coating of fireproof mortar to the aluminum or plastic.

One drawback to method is that the board is flexible and accordingly appropriate only for wrapping pipes or covering flat and even surfaces.

The German No. 3,444,881 C2 discloses a method of manufacturing board. The core is a layer of mineral fiber, glass staple or wadding for example. The core is more or less compacted to a fraction of the thickness of the final board. A layer of mortar is applied to each side of the core. Glass fibers have been blended into the mortar. This board is not very strong and is appropriate only for surfacing solid concrete walls.

SUMMARY OF THE INVENTION

A principal object of the present invention is a method of manufacturing composite board that will provide satisfactory insulation of both noise and heat, that will have satisfactory mechanical properties, that will be relatively light in weight, smooth, and flat, and that is comprised of little material.

The method of manufacturing composite board in accordance with the invention is characterized in that the core (2) is expanded plastic (2') or fibers, beads, flakes, strips, fragments of organic or inorganic material or both or a combination thereof and is introduced continuously and horizontally; in that the mortar dries hard and dribbles while still fluid onto, and is distributed over, the side of the core that is to be coated; in that a web of the glass cloth is laid close enough to the top of the core to leave only an adhesive layer between them; in that a doctor (10) distributes the layer (9) of mortar such that the web of glass cloth will be embedded in it; and in that the wet layer of mortar is dried and solidified.

Some of the present invention's advantages will now be described. The core can be of expanded material alone or of expanded material with a layer of fibers, glass wadding for example, with a layer of beads, chips, flakes, fragments, etc. of organic or inorganic materials, or with an extruded layer of more expanded material. Since the core is in the form of a web and the mortar is preferably dribbled onto it at a rate that matches the speed it is advancing at, the glass cloth can be embedded in the mortar while it is still moist and there will be no internal stress to buckle the board. Once the mortar is dry, accordingly, the board will be strong and will satisfactorily insulate both heat and noise. It can be employed not only to surface existing walls, but as a wall in its own right. It can also be plastered, papered, or tiled.

One particular advantage is that a layer of reinforced mortar can be applied to the smooth surface of the core to produce boards that are especially practical in the construction industry, for erecting partitions for example. Such partitions will be strong enough to support tiles, coverings, and fixtures.

It is of essential significance that, although the mortar on one side of the core is very fluid while it is being applied and accordingly very thin, it will dry extremely strong. It has been demonstrated practical for the mortar to be applied fluid enough to spread 22 to 28 cm as measured with the Wicker cup in accordance with DIN 1060.

It is practical in the foregoing event for the liquid mortar to flow onto the core between two close-together rotating cylinders. The cylinders keep the mortar homogeneous enough to harden uniformly and only once it has spread. The cylinders can also be spaced and rotated to precisely regulate the flow of the mortar.

The flow of mortar can for example be regulated by opening and closing a device that comprises the aforesaid cylinders.

Compacting the layer of beads, chips, flakes, fragments, etc. of organic or inorganic materials is also practical. This procedure will result in a core essentially as thick as the finished board and strong enough to be exposed to static or dynamic stress of the extent to be expected when employed for the purposes discussed herein.

It is of advantage when the layer of beads, chips, flakes, fragments, etc. of organic or inorganic materials is coated with an expanded extrudate for the extrudate to permeate or bind the beads etc. The result will be a core or sandwich of organic or inorganic materials wherein at least one surface of the mineral fibers, which are not particularly strong mechanically, will be in contact with the more durable and homogeneous expanded extrudate.

The expanded extrudate can be polystyrene or glass, a recycled bulk or expanded extrudate, or a wood-bonding sheet. Other similar materials can also be employed. Some examples are recycled bulk or expanded and compressed recycled materials, expanded polyurethane, and such solid blends as wood-bonding and similar materials. It is essential in this event as well for the expanded-material core to be provided at some point with a rigid and reinforced sandwich structure that will render it not only fireproof but also able to have tiles for example cemented or otherwise fastened to it or to be plastered, wallpapered or painted.

It is of advantage for the layer of reinforced mortar to be very thin, as thin as 0.2 mm for example. There is on the other hand essentially no upper limit.

To ensure relaxed but uniform embedding of the glass cloth, it can be introduced by way of a tension equalizer.

The glass cloth can be woven or non-woven. Fabrics of aramid, polyester, and similar materials can also be employed when sufficiently stable. Metal gauze, copper or stainless steel for example, can also be employed.

For a full understanding of the present invention, reference should now be made to the following detailed description of the preferred embodiments of the invention as illustrated in the accompanying drawings.

BRIEF DESCRIPTION OF THE DRAWINGS

FIG. 3d is a cross-section through a section of still another type of board with a core of mineral staple or wadding.

Figure 1A:
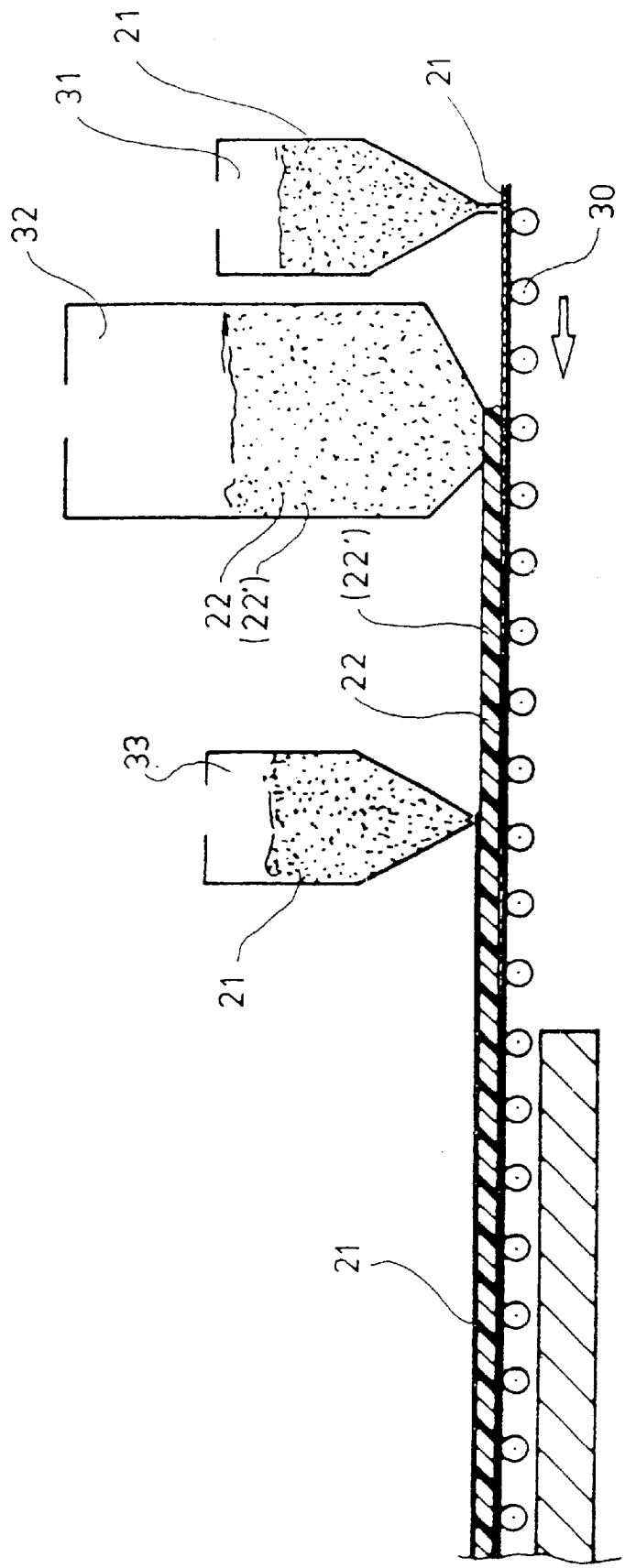
FIG. 1a illustrates a production line for manufacturing a continuous core.

The creation of a continuous core 2 will now be discussed with reference to FIG. 1a. An extruder 31 extrudes a layer of expanding extrudate 21 onto a roller pavement 30. A fiber distributer 32 deposits staple or wadding 22 or 22' onto the advancing expanding extrudate 21. The staple or wadding can be mineral or plastic fiber, sheep's, llama's, or other animal wool, fiber from recycled clothing etc. or a combination thereof. Fiber distributer 32 can deposit staple or wadding 22 or 22' onto expanding extrudate 21 loose or tight.

The core can be a core 2''' with two layers instead of a core 2 with one layer. Core 2''' can comprise a layer of expanding extrudate 21 and a layer of staple or wadding 22 or 22'. Another layer of expanding extrudate 21 can be extruded over staple or wadding 22 or 22', producing a core 2'''' in the form of a sandwich with a layer of staple or wadding between two outer layers of expanding extrudate.

Figure 1B:
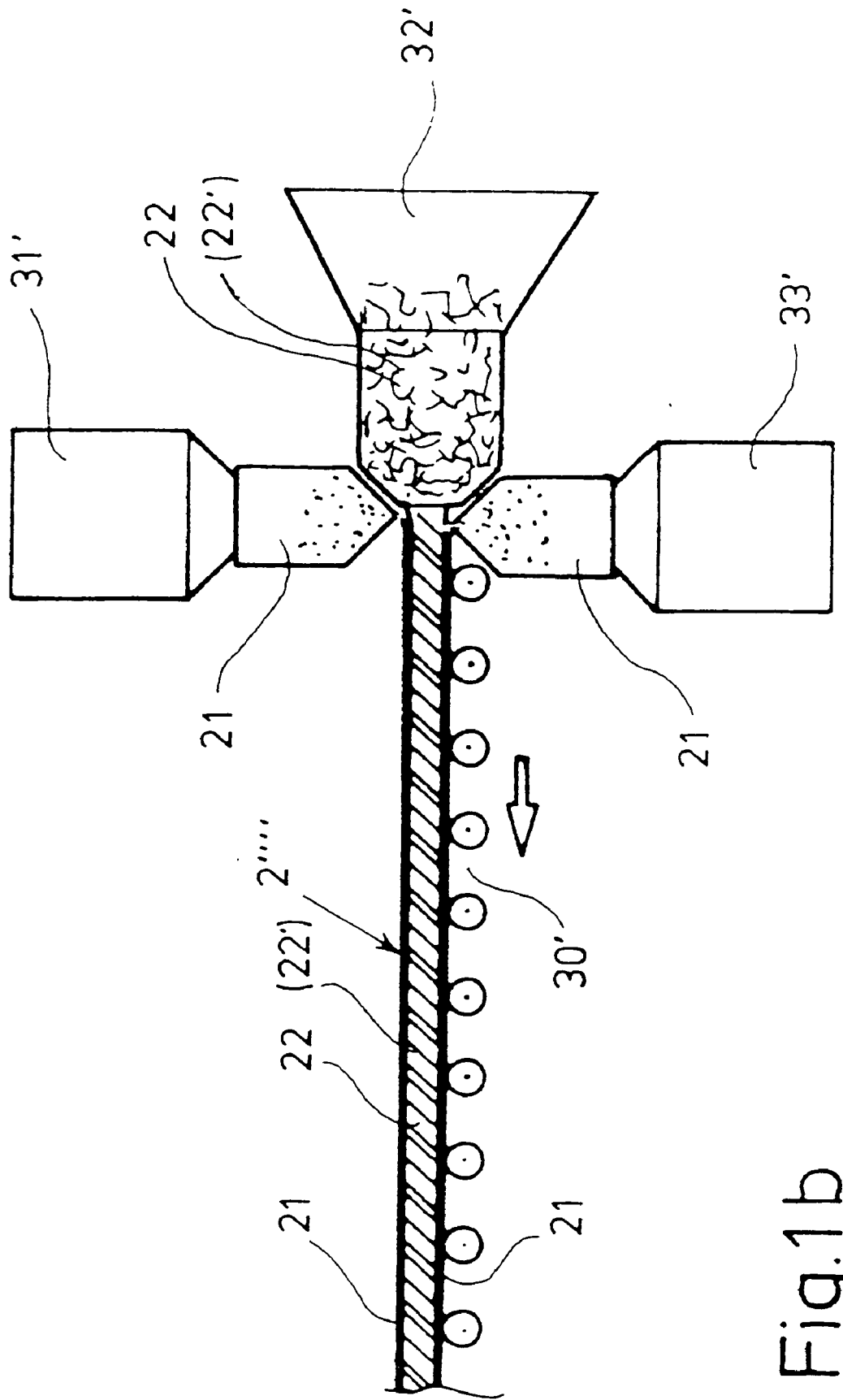
FIG. 1b illustrates another version of a production line for manufacturing a continuous core.

Another type of core is illustrated in FIG. 1b. Mineral or animal staple or wadding 22 or 22' is compressed into a web by a fiber compactor 32'. Upon leaving the compactor, staple or wadding 22 or 22' will be relieved of pressure and expand again, and individual fibers will project out of the upper surface of the core. When an extruder or extruders 31' and 32' extrude expanding extrudate 21 onto this loosely compacted core of staple or wadding 22 or 22', the projecting fibers enter into an intimate bond with the extrudate. The result is a continuous core 2'''' that rests on pavement 30' and exhibits the positive properties of a hardened expanding extrudate 21 in conjunction with staple or wadding 22 or 22', specifically satisfactory insulation of noise and heat along with static and dynamic endurance.

Fiber distributer 32 or fiber compactor 33' can also compact the staple or wadding 22 or 22' in a core 2" or 2''' until the surface is smooth and resistant.

Figure 2:
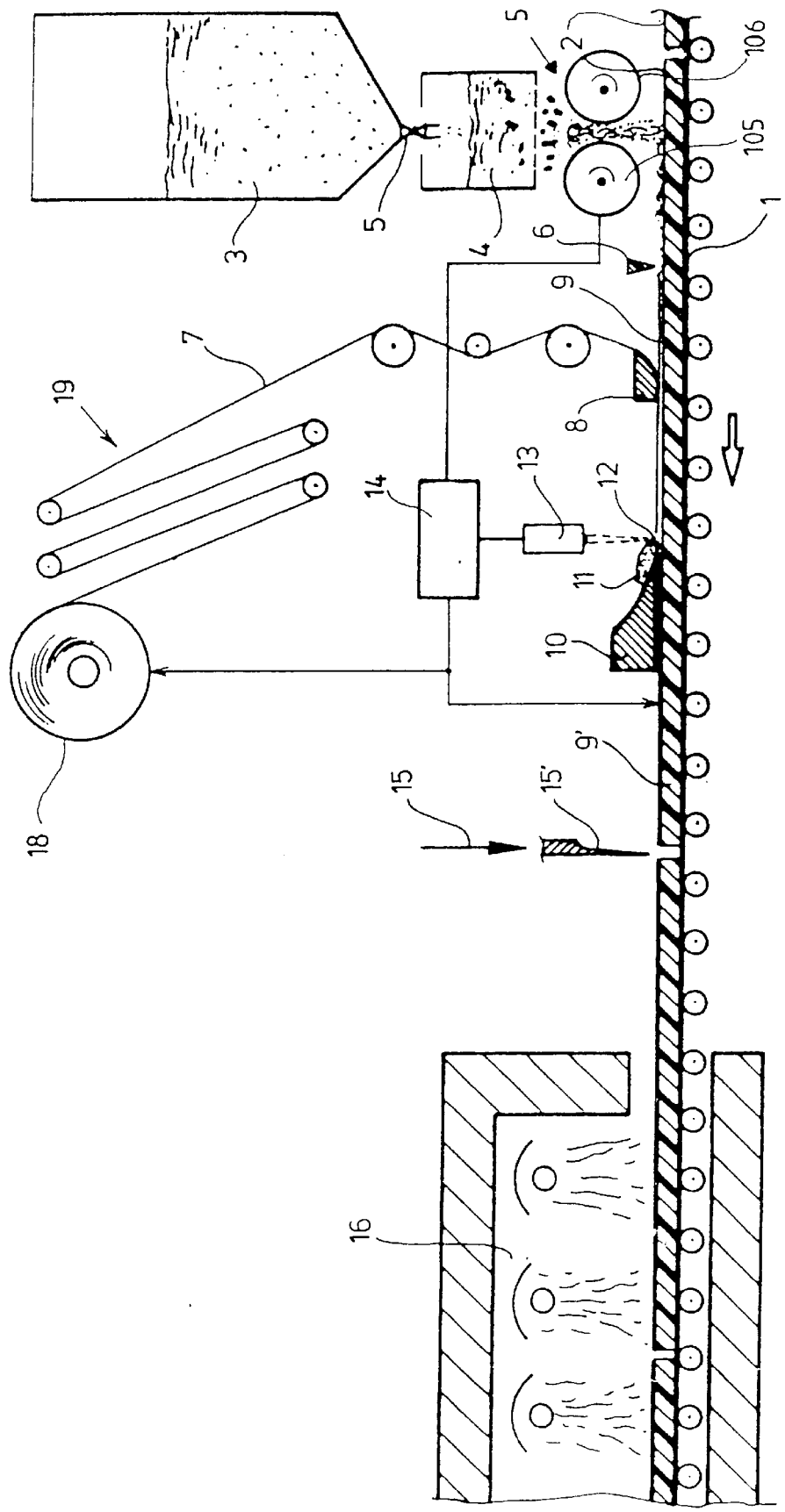
FIG. 2 illustrates machinery for manufacturing board out of a continuous core.

Core 2, 2", 2''', or 2'''' can be further processed in the equipment illustrated in FIG. 2. Composite board can be produced therein from a continuous core 2. The core is deposited on a driven roller pavement and can be trimmed into separate panels or sections. A mortar hopper 3 is positioned above a colander 4. Between colander 4 and the surface of core 2 is a flow regulator 5. Flow regulator 5 comprises two narrowly separated cylinders 105 and 106 that rotate in the same sense. Cylinders 105 and 106 are jacketed with water-repellent rubber with a Shore hardness of W 1357. Their diameter is approximately 200 mm. They are synchronized by a variable-speed motor.

The viscosity of the mortar flowing out of hopper 3 and through colander 4 and flow regulator 5 is extremely critical. The mortar is a shallow-bed mortar based on cement and containing plastic to render the hardened mortar more elastic. The mortar also contains fillers to improve its thixotropic properties, which must be maintained precisely constant. Especially appropriate for this purpose are powdered quartz or chalk for example. Recipes for various purposes can be obtained from specialized firms.

The spread of the mortar is measured in a frustroconical Wickert ring 40 mm high and with an upper inside diameter of 79 mm and a lower inside diameter of 65 mm resting on a Hegmann surface in accordance with German Standard DIM 1060 (EN 196). The diameter of the pancake should range between 22 and 28 and preferably between 23 and 27. The thready consistency of the mortar is homogenized or maintained by the rotation of cylinders 105 and 106. The mortar flows onto core 2 through the gap between the cylinders and is evenly distributed over the surface of the core by a doctor 6 downstream of the cylinders.

Downstream of doctor 6 a continuous web 7 of woven or nonwoven glass cloth is introduced practically free of stress, subject, that is, only to its own weight and advancing at the same speed as core 2. The cloth is obtained from a roll 18 and travels through a tension equalizer 19 of a type in itself known from textile engineering. A beam 8 lays web 7 just (approximately 2 mm) above core 2 and accordingly slightly embeds it in layer 9 of mortar. The mortar is forced against the bottom of the web and between its interstices, ensuring satisfactory adhesion in that the distance from web 7 of woven or non-woven glass cloth is such that precisely one more layer of adhesive is maintained between the cloth and the upper surface of the web.

Another doctor 10 scrapes excess mortar off the upper surface of the cloth and smoothes it into a layer that not only embeds web 7 of woven or non-woven glass cloth but also rises slightly above it, leaving the cloth as a reinforcement in the still wet mortar 9, which nevertheless contacts the surface of the web only by way of a thin layer of mortar. The excess mortar 11 scraped off by second doctor 10 creates a downstream demarcation in the form of a lip 12 that can be detected by an optico-electronic or capacitative sensor 13.

When lip 12 moves too far from second doctor 10, sensor 13 emits a signal to a data processor 14, which reduces the flow through flow regulator 5 by decelerating cylinders 105 and 106.

When lip 12 moves back toward second doctor 10., data processor 14 will reestablish the speed of the cylinders, and flow regulator 5 will emit more mortar.

The layer 9 of mortar on core 2 downstream of second doctor 10 is accordingly highly uniform.

Core 2 now arrives below a lengthing position 15, where a knife blade 15' cuts through the still moist layer 9 of mortar and its reinforcing web 7 of woven or non-woven glass cloth and optionally through core 2", 2''', or 2'''' as well, creating an edge at regular intervals for edge-to-edge modular mounting or at other convenient points when the board is to be continuous. Core 2 is now dried and solidified along with its glass-reinforced layer 9 of mortar in a kiln 16. The reinforced layer 9' of mortar is accordingly firmly anchored into 2', 2", 2''', or 2''''. If the core is to be coated on only one surface, the composite board can be employed as is. Usually, however, the core is coated on both sides. The core coated on one side is accordingly returned upside-down to the upstream end of roller pavement 1, and the aforesaid procedure is repeated. Composite board with a core of mineral fiber or of any other organic or inorganic materials can be produced as hereintofore specified. Appropriate are various in-themselves known mixtures of cement, water, and plastic that can be made into shallow-bed mortars. Although their recipes could be specified, they will not be herein because they do not constitute part of the invention. Such shallow-bed mortars resemble the usually water-resistant mortars employed for laying tile.

The thickness of the core is relatively uncritical. It can be between a few millimeters and a few centimeters, between 20 and 100 mm for example, depending on its purpose. Layer 9 of mortar will generally be applied as economically as possible, just enough to cover the glass cloth.

Figure 3A:
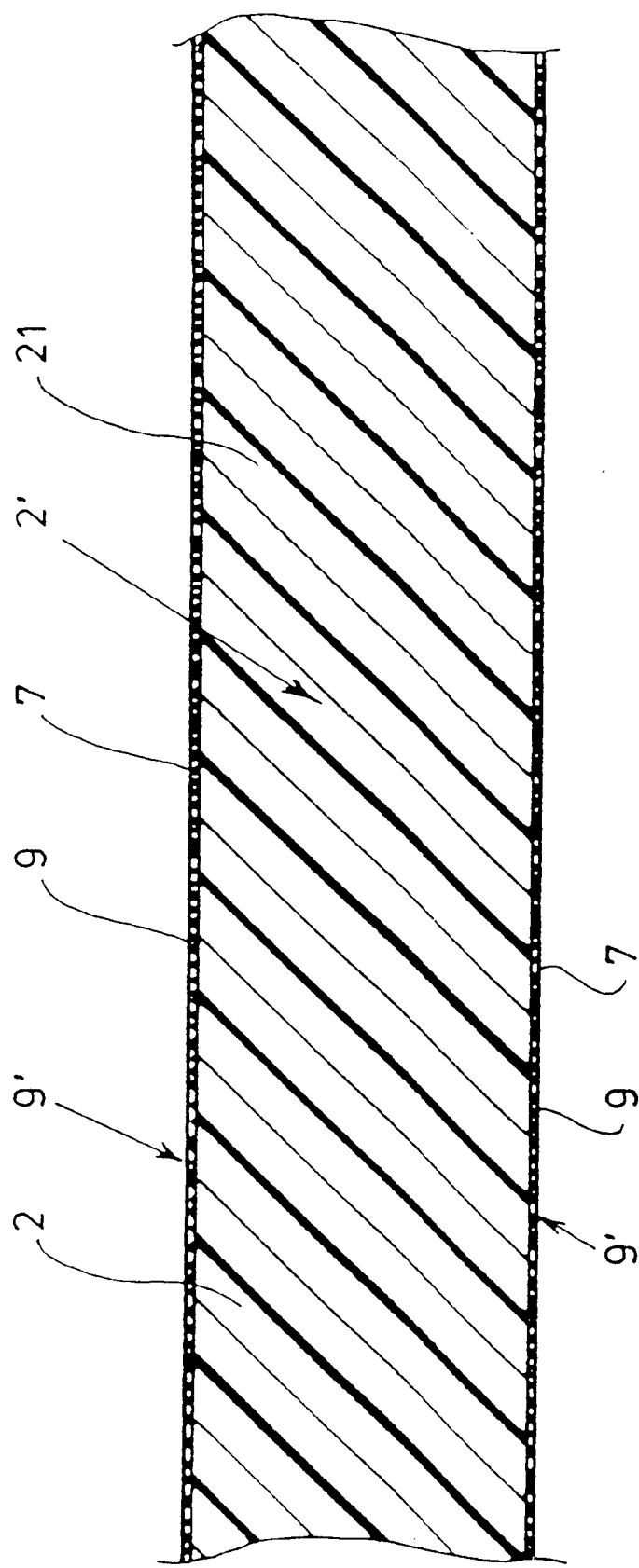
FIG. 3a is a cross-section through a section of board with a core of expanded material.
Figure 3B:
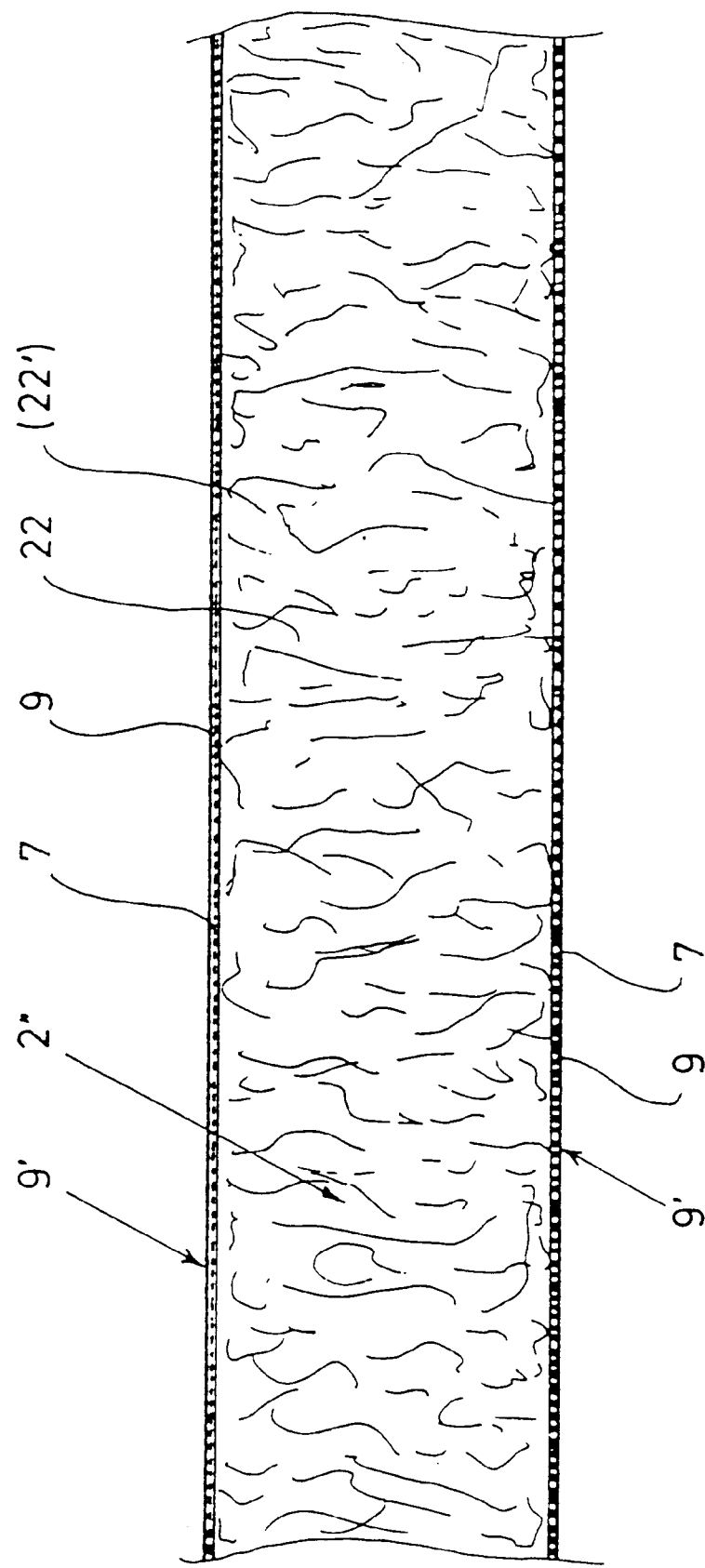
FIG. 3b is a cross-section through a section of board with a core of mineral staple or wadding.
Figure 3C:
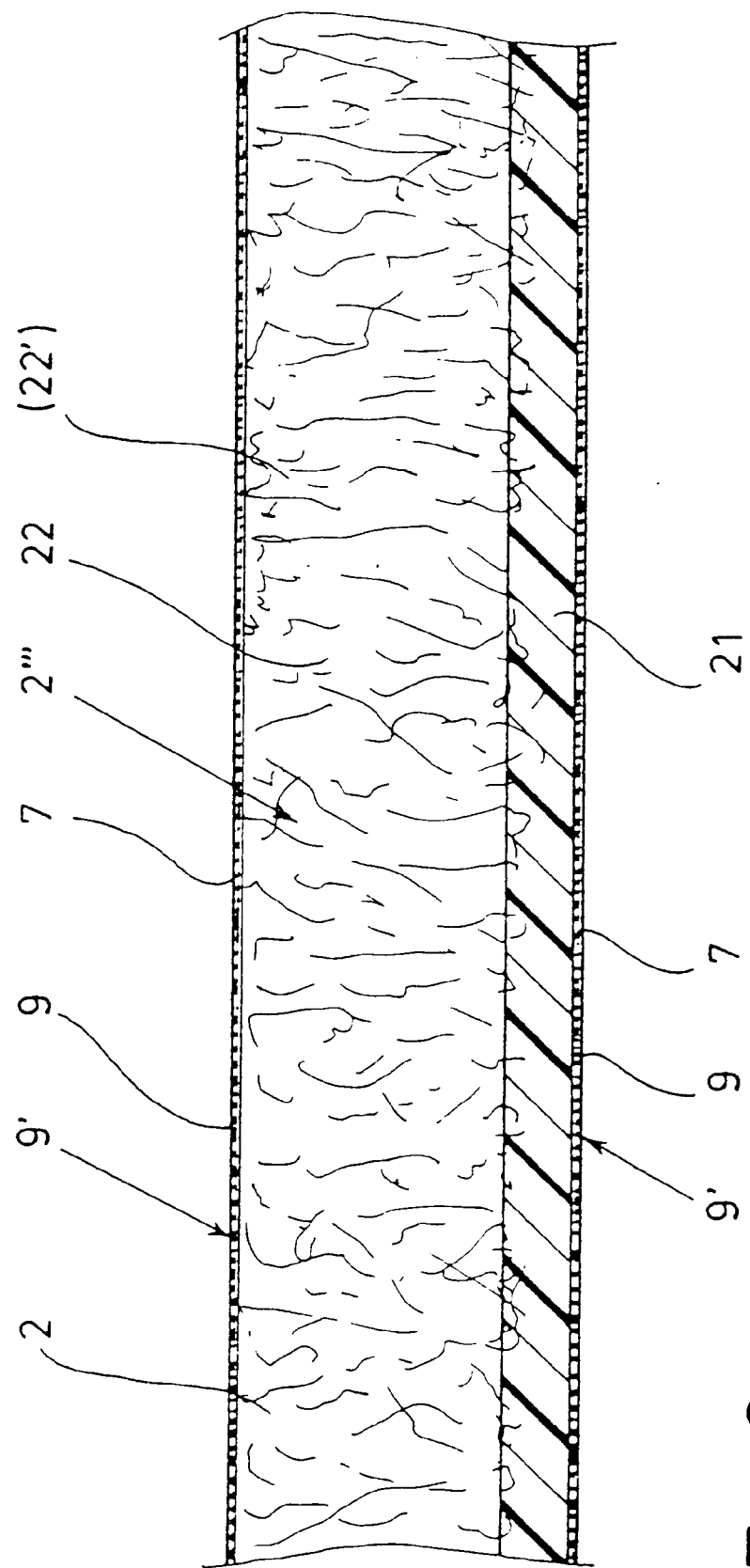
FIG. 3c is a cross-section through a section of another type of board with a core of mineral staple or wadding.

FIGS. 3a through 3c illustrate various composite boards of types that can be produced in accordance with the present invention.

The core 2' of expanded extrudate 21 illustrated in FIG. 3a has a layer 9' of mortar reinforced with an embedded web 7 of woven or non-woven glass cloth on each side.

The board illustrated in FIG. 3b on the other hand has a core 2" of mineral or animal staple or wadding 22 or 22' with a layer 9' of mortar reinforced with an embedded web 7 of woven or non-woven glass cloth on each side.

The core 2''' illustrated in FIG. 3c combines mineral or animal staple or wadding 22 or 22' with a layer of expanded extrudate. It is also coated on each side with a layer 91 of mortar reinforced with an embedded web 7 of woven or non-woven glass cloth.

The core 2'''' of the composite board illustrated on FIG. 3d is particularly practical. A layer of mineral or animal staple or wadding 22 or 22' is sandwiched between two coats of expanded extrudate 21. The fibers project like those illustrated in FIG. 3c into each coat of extrudate. The result is a very intimate and solid bond between mineral or animal staple or wadding 22 or 22' and the coats of expanded extrudate 21. The two coats prevent the fibers from escaping.

Escape can be further inhibited by mixture with wool or by wool alone.

It is also possible to chemically coat or impregnate each individual fiber. Board made of chemically treated fiber does not need to be coated with expanded extrudate, mortar, or cloth. A coat 9' of mortar reinforced with an embedded web 7 of woven or non-woven glass cloth can also be applied to each side of such a highly stable core 2''''.

One particular advantage of all four composite boards specified herein is the common interface between the mortar and the glass cloth. This common interface ensures that the glass cloth will be intimately secured to the core by the mortar and that the mortar will have a surface appropriate for papering, tiling, etc.

There has thus been shown and described a novel method of manufacturing composite board which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

I claim:

1. A method of manufacturing composite board comprising a substantially planar core having opposite flat sides, a coat of solidified, cement-like mortar disposed on at least one of said sides and a layer of cloth embedded within said mortar, said mortar and said cloth forming a reinforcement for said core and providing a supporting surface for a covering material, said method comprising the steps of:

(a) continuously introducing said core into manufacturing apparatus in a horizontal direction;

(b) dribbling said mortar in a fluid condition onto one side of said core and distributing said mortar over said one side to form a layer;

(c) applying an endless web of cloth in a substantially tension free condition to said layer of mortar at a speed which is the same as a speed of movement of said core in said horizontal direction;

(d) impressing and embedding said endless web into the mortar layer to provide reinforcement;

(e) wiping off, with a doctor, the mortar which exceeds a prescribed layer thickness, thereby forming a lip of mortar upstream of the doctor;

(f) sensing the quantity of mortar contained in the mortar lip;

(g) controlling the rate of mortar dribbled onto the core in dependence upon the sensed quantity;

(h) cutting a still moist mortar layer and embedded cloth to selected lengths; and (i) drying and solidifying the mortar layer with the embedded cloth.

2. Method as in claim 1, wherein the mortar dribbles fluid enough to spread 22 to 28 cm as measured with a Wicker ring in accordance with DIN 1060.

3. Method as in claim 1, wherein the still fluid mortar dribbles onto the core through two close-together cylinders.

4. Method as in claim 3 wherein the distance between the cylinders and the speed they rotate at can be varied.

5. Method as in claim 1, wherein a sensor detects how much excess mortar is upstream of the doctor and accordingly opens and closes a flow regulator to regulate how much mortar dribbles through a colander.

6. Method as in claim 4, wherein the speed the cylinders rotate at is varied to regulate the flow of mortar.

7. Method as in claim 1, wherein a layer of fibers, beads, flakes, or fragments of organic or inorganic materials are compacted to create the core.

8. Method as in claim 7, wherein the layer of fibers, beads, flakes, strips, or fragments of organic or inorganic materials is coated with foamed extrudate such that their fibers project into it.

9. Method as in claim 1, wherein, once the reinforced layer of mortar has been dried and solidified on one side of the core, the core is turned upside down and the procedure repeated on the uncoated side.

10. Method as in claim 1, wherein the mortar is initially only roughly distributed and in that the cloth is embedded in the roughly distributed mortar.

11. Method as in claim 1, wherein the dried reinforced mortar is at least 0.2 mm thick.

12. Method as in claim 1, wherein the cloth is introduced by way of a tension equalizer.

13. Method as in claim 1, wherein the core is formed of a foamed material selected from the group consisting of foam plastic, glass foam and foamed recycled material.

14. Method as in claim 13, wherein the foamed recycled material is polystyrene, glass, or bulk or foamed recycled material or wood-bonding board material.

15. Method as in claim 1, wherein said cloth is selected from the group consisting of non-woven cloth (fleece) and woven cloth.

* * * * *